United States Patent [19]

Shimeki et al.

[11] Patent Number: 4,809,087
[45] Date of Patent: Feb. 28, 1989

[54] APPARATUS FOR RECORDING A DISCRIMINATIVE SIGNAL

[75] Inventors: Yasuharu Shimeki, Suita; Hiroshi Matsushima, Hirakata; Masamitsu Ohtsu, Kadoma; Nobuyoshi Kihara, Amagasaki, all of Japan

[73] Assignee: Matsushita Electric Industrial Co., Ltd., Kadoma, Japan

[21] Appl. No.: 124,434

[22] Filed: Nov. 23, 1987

Related U.S. Application Data

[63] Continuation of Ser. No. 767,973, Oct. 21, 1985, abandoned, which is a continuation-in-part of Ser. No. 487,835, Apr. 22, 1983, abandoned.

[30] Foreign Application Priority Data

Apr. 27, 1982 [JP] Japan .................................. 57-72064

[51] Int. Cl.$^4$ .......................................... H04N 5/782
[52] U.S. Cl. ...................................... 360/19.1; 360/27
[58] Field of Search ............... 360/8, 9.1, 19.1, 32, 360/10.3, 38.1, 27, 32; 369/47, 48, 49, 59

[56] References Cited

U.S. PATENT DOCUMENTS

| | | |
|---|---|---|
| 3,732,364 | 5/1973 | Terada . |
| 4,282,551 | 8/1981 | Kanazawa et al. ................... 360/32 |
| 4,303,950 | 12/1981 | Taniguchi et al. ................. 360/19.1 |
| 4,327,382 | 4/1982 | Tanaka ................................. 360/32 |
| 4,392,162 | 7/1983 | Yamamoto ........................ 360/10.3 |
| 4,403,263 | 9/1983 | Kageyama et al. .................... 360/32 |
| 4,437,125 | 3/1984 | Yamamoto ......................... 360/38.1 |
| 4,463,387 | 7/1984 | Hashimoto et al. ................. 360/33.1 |
| 4,473,850 | 9/1984 | Foerster et al. .................... 360/19.1 |
| 4,477,844 | 10/1984 | Nakano et al. ......................... 360/8 |
| 4,583,132 | 4/1986 | Nakano et al. .................... 360/19.1 |

FOREIGN PATENT DOCUMENTS 0090582 5/1983 European Pat. Off. .

OTHER PUBLICATIONS

IEEE Transactions on Communications, Jun. 1974, pp. 846–848, N.Y., US; J. Bourland et al: "The Transcribed Demonstration", p. 846, line 40–p. 847, line 31.

Primary Examiner—Donald McElheny, Jr.
Attorney, Agent, or Firm—Wenderoth, Lind & Ponack

[57] ABSTRACT

In a magnetic recording and reproducing device having at least one rotating magnetic head for recording and reproducing video signal and digital form audio signal in a contiguous manner along each track which is inclined at an angle relative to the direction of travel of a magnetic tape, a discriminator signal is combined to the digital form audio signal. The discrimination signal has a first section carrying a check code and a second section carrying information. During the reproducing mode, the discrimination signal is detected such that the information carried in the second section is made invalid when the check code has a predetermined code pattern, and the information carried in the second section is made valid when the check code has a code pattern other than the predetermined code pattern. Furthermore, the check code is used to indicate the type of information contained in the second section.

2 Claims, 7 Drawing Sheets

APPARATUS FOR RECORDING A DISCRIMINATIVE SIGNAL

CROSS REFERENCE TO THE RELATED APPLICATION

This application is a continuation, of now abandoned application Ser. No. 767,973, filed Oct. 21, 1985, which is in turn a continuation-in-part of now abandoned application Ser. No. 487,835, filed Apr. 22, 1983.

BACKGROUND OF THE INVENTION

1. Field of the invention

The present invention relates to a magnetic recording and reproducing device which can record and reproduce a discriminative signal.

2. Description of the Prior Art

In the audio field, recently many practices have been made to convert the audio signal from an analog form to a digital form when recording, and convert the signal back to an analog form when reproducing, so as to obtain a high fidelity recording and reproducing. Since it is simple to combine and separate signals when an analog audio signal is converted to a digital signal, it is advantageous to employ the digital audio signal recording in the field of video tape recorder such that the digital audio signal and video signal are recorded simultaneously. A typical video tape recorder has two heads alternately scanned along a magnetic tape, one head thereby recording (or reproducing) video signals of even fields, and other head recording (or reproducing) video signals of odd fields. Therefore, while one of the two heads is in use for recording (or reproducing) the video signal, the other is not in use. If this other head, which is not in use, can be used for recording (or reproducing) the digital signal, then the digital signal recording (or reproducing) can be carried out with a high efficiency.

To this end, it is suggested, as shown in FIGS. 1a and 1b and also disclosed in U.S. Pat. No. 4,303,950 to Taniguchi et al., that the magnetic tape 4 wound around the cylinder 1 should extend angularly more than 180° around the cylinder 1, thereby covering the two heads 2 and 3 at the same time. When the arrangement as shown in FIG. 1a is employed, the signal alignment in the time domain with respect to the scan of heads 2 and 3 is shown in FIG. 2a, and the actual signal alignment on the magnetic tape 4 is shown in FIG. 3a. And, when the arrangement as shown in FIG. 1b is employed, the signal alignment in the time domain with respect to the scan of heads 2 and 3 is shown in FIG. 2b, and the actual signal alignment on the magnetic tape 4 is shown in FIG. 3b. In FIGS. 2a, 2b, 3a and 3b, shaded sections show areas where digital audio signals are stored, each shaded section containing the digital audio signal for 1 field. Such a shaded section is located in front of, or in back of, each span of section where a video signal of 1 field is recorded.

As shown in FIG. 4, the audio digital signal for 1 field comprises a plurality of frames aligned in series, and each frame comprises a block including a plurality of sample data aligned in series for the purpose of error correction, and having a sync signal and an error detecting signal provided, respectively, at opposite ends of the block. The digital signal may be further provided with a discrimination signal in a digital form, as shown in FIG. 4, for the purpose of signal processing and effecting various controls. Such a discrimination signal may contain information as to the time and/or field number, thereby giving access to a required video signal, or may contain information as to whether the audio signal is in a stereophonic form or in a monophonic form.

It is to be noted that the discrimination signal shown in FIG. 4 is located in front of the audio signal of 1 field, but can be divided into pieces and distributed in a plurality of frames.

From the practical point, the discrimination signal is not an indispensable signal and, therefore, it is better to leave the choice as to whether or not to use the discrimination signal to the user, because when compared with the case wherein the discrimination signal is not needed, the arrangement of the device will have much freedom such that a circuit for detecting the discrimination signal can be simplified or eliminated.

However, in order to have a compatibility with a tape which has been recorded, it is necessary to record the discrimination signals at predetermined locations in the tape. And, in a device which does not utilize the discrimination signal (hereinafter referred to as a non-discriminative type device), it is necessary to record, during recording, a signal indicating that the discrimination signal, is invalid. Contrary, in a device which utilizes the discrimination signal (hereinafter referred to as a discriminative type device), it is necessary to detect, when reproducing a tape having invalid discrimination signals, that the discrimination signal is invalid.

SUMMARY OF THE INVENTION

The first object of the present invention, which is concerned with a magnetic recording and reproducing device dealing with a signal format having discrimination signals, is to present a non-discriminative type magnetic recording and reproducing device which has a compatibility with a tape recorded by both discriminative type and non-discriminative type devices, and yet having a circuit arrangement which is simplified.

The second object of the present invention is to present a discriminative type magnetic recording and reproducing device wherein the discrimination signal comprises at least one set of a signal arrangement including an information section where a certain information is contained and a counterpart section specifying the type of information contained in the information section, and yet arranged such that the magnetic tape has compatibility between various types of magnetic recording and reproducing devices.

In accomplishing these and other objects, a digital signal including a digitized audio signal and discrimination signal is divided into pieces in the order of field unit of the video signal, thereby defining a digital signal; and this digital signal is recorded in a time sharing manner with the video signal in the order of field. In the case where a section of the discrimination signal has a check code with a predetermined code pattern, the information of the other bits of the discrimination signal is made invalid. And, in the case where the section of the discrimination signal has a check code other than the predetermined code pattern, it is detected that the information of the discrimination signal is valid. When it is discriminated valid, the type of information of other bits in the discrimination signal is utilized according to the code pattern of the check code.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which.

DESCRIPTION OF THE PREFERRED EMBODIMENT

Figure 6:
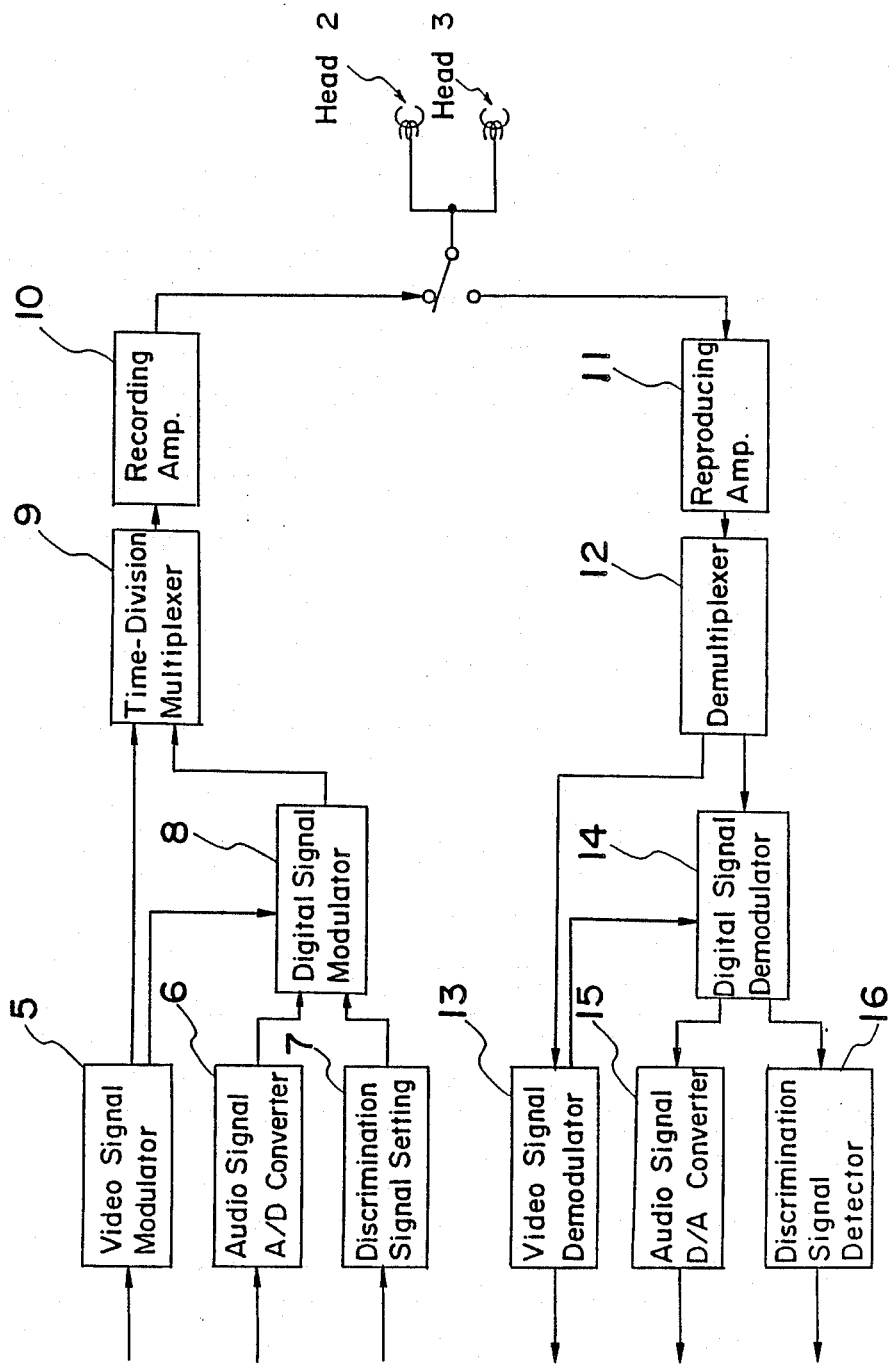
FIG. 6 is a block diagram of a magnetic recording and reproducing device according to one preferred embodiment of the invention.

Referring to FIG. 6, a block diagram of a magnetic recording and reproducing device according to one preferred embodiment of the present invention is shown.

Figure 4:
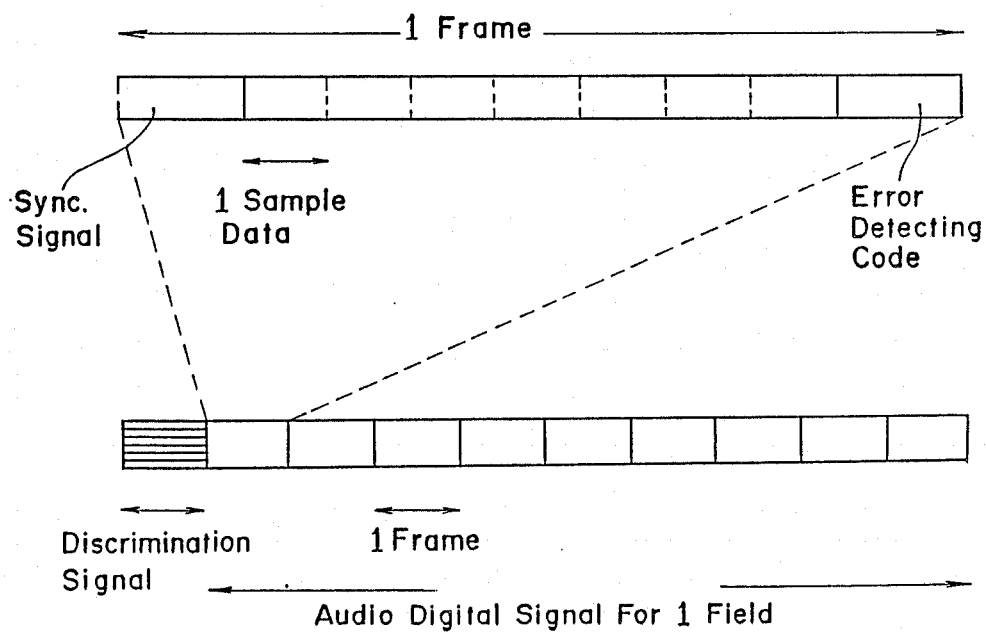
FIG. 4 is a diagram showing the signal arrangement employed in the present invention.

During a recording mode, a video signal is applied to a video signal modulator 5 in which the video signal is suitably modulated, e.g., frequency modulated, for the preparation of a video signal for recording on a magnetic tape. An audio signal is applied to an audio signal A/D (analog-to-digital) converter 6 in which the audio signal is digitized. A discrimination signal setting circuit 7 is provided for setting and generating a discrimination signal including information of time, field number, type of audio signal, e.g., whether it is stereophonic or monophonic, etc. The discrimination signal from the discrimination signal setting circuit 7 and the audio signal from the audio signal A/D converter 6 are combined in a digital signal modulator 8 in a manner such as shown in FIG. 4.

Figure 8:
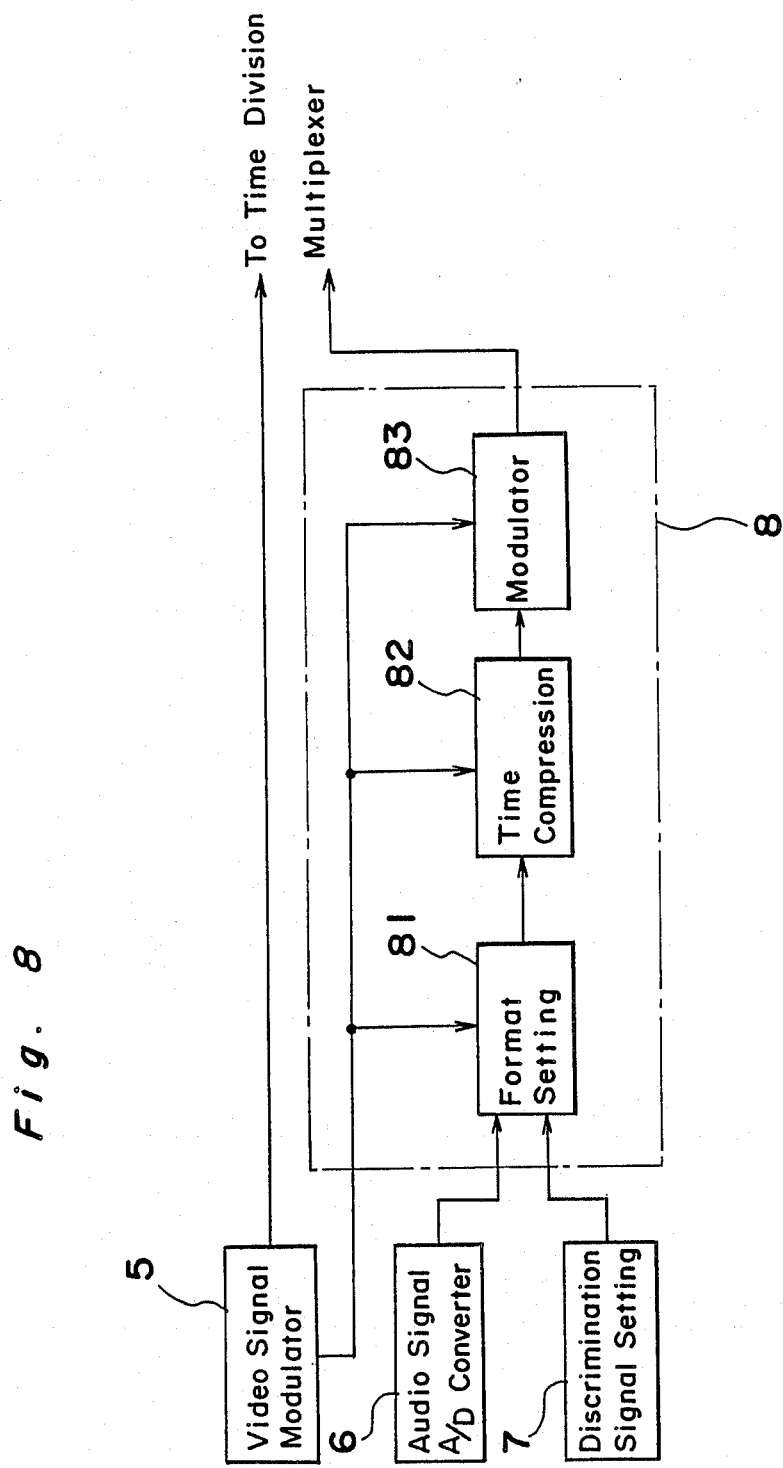
FIG. 8 is a block diagram showing a detail of the digital signal modulator.

As shown in FIG. 8, the digital signal modulator 8 has a format setting circuit 81, a time compression circuit 82, and a modulator 83, which are connected in series. In synchronization with a control signal from the video signal modulator, the format setting circuit 81 arranges the signal in a predetermined format such that the digital signal and the discrimination signal are added with a data which compensates and corrects an error in the reproduced signal during the signal reproduction. The formatted signal is applied to the time compression circuit 82 for compressing the formatted signal in the time domain in synchronizing with a control signal from the video signal modulator. Then, the compressed signal is applied to the modulator 83 for effecting the modulation necessary for the signal recording in synchronizing with a control signal from the video signal modulator. The digital signal obtained in the above described manner synchronizes with a video signal to be recorded.

Figure 1A:
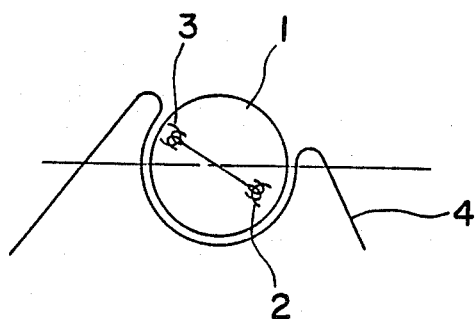
FIGS. 1a and 1b are diagrammatic views showing an arrangement of the magnetic heads and tape wound around the cylinder, employed in the present invention.
Figure 1B:
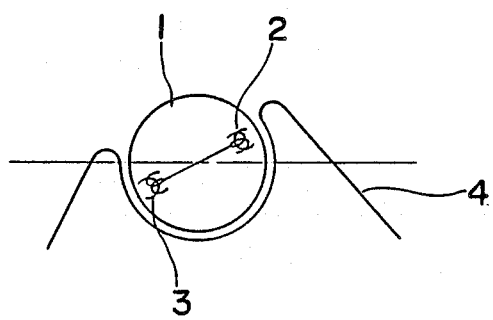
Figure 2A:
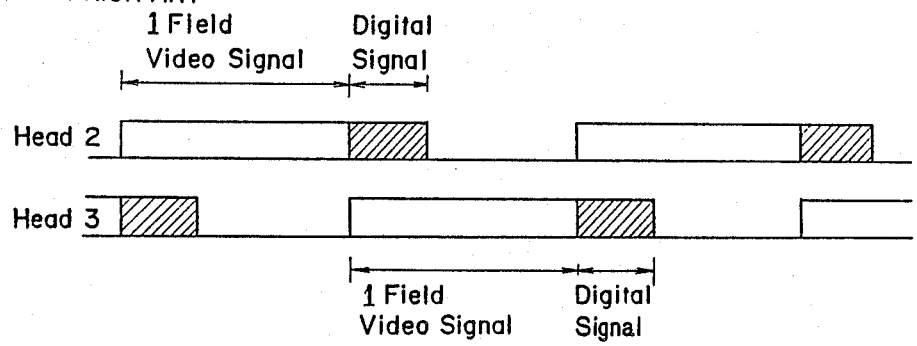
FIGS. 2a and 2b show signal alignments in time domain effected by the heads shown in FIGS. 1a and 1b, respectively.
Figure 2B:
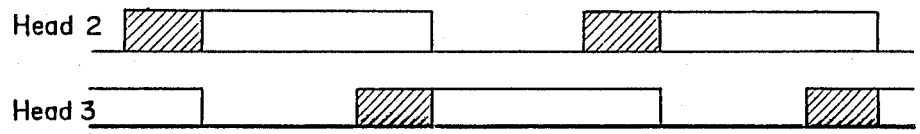
Figure 3A:
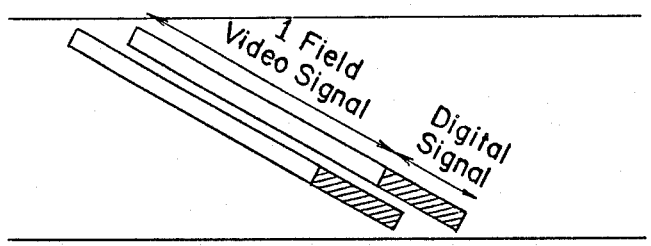
FIGS. 3a and 3b show the actual signal alignment on a magnetic tape effected by the heads shown in FIGS. 1a and 1b, respectively.
Figure 3B:
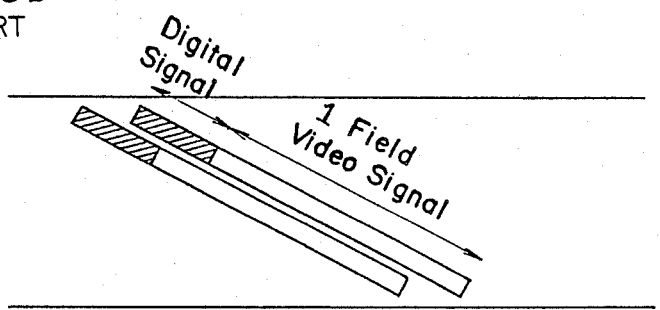

The combined digital signal from the digital signal modulator 8 is further combined with the video signal from the video signal modulator 5 in a time sharing manner, as shown in FIG. 2a or 2b, by a time-division multiplexer 9 such that the video signal and digital signal occur alternately in a predetermined time slots. The combined video signal from the time-division multiplexer 9 is applied to a recording amplifier 10 and further to heads 2 and 3 for recording the combined video signal on a magnetic tape in a pattern shown in FIG. 3a or 3b.

Then, in a reproducing mode, the combined recorded video signal, i.e.—the signal picked by the heads 2 and 3, is amplified by a reproducing amplifier 11 to a level necessary for the signal demodulation. The combined video signal thus amplified is applied to a demultiplexer 12 in which it is separated into a modulated video signal and a digital signal. The modulated video signal is applied to a video signal demodulator 13, from which a demodulated video signal is produced. In the mean time, the digital signal is applied to a digital signal demodulator 14 for demodulation and is separated into an audio digital signal and a discrimination signal.

Figure 9:
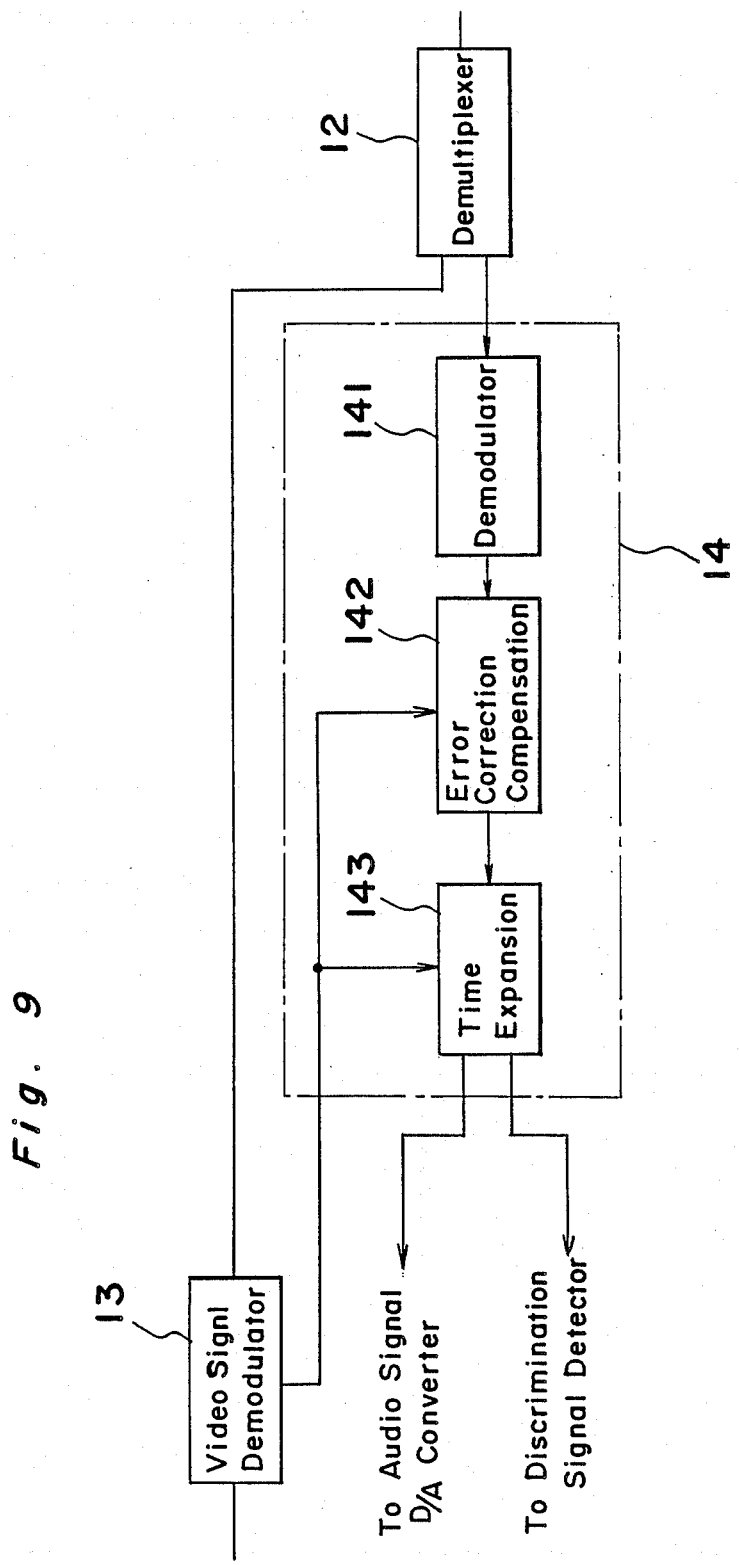
FIG. 9 is a block diagram showing a detail of the digital signal demodulator.

As shown in FIG. 9, the digital signal demodulator 14 has a demodulator 141, an error correction and compensation circuit 142 and a time expansion circuit 143 which are connected in series. In the demodulator 141, the modulated signal as modulated in the modulator 83 is demodulated. Then, in the error correction and compensation circuit 142, the error in the reproduced signal is corrected and compensated in synchronizing with a control signal from the video signal demodulator. The corrected and compensated signal is time expanded in the time expansion circuit 143 in synchronizing with a control signal from the video signal demodulator. Accordingly, the audio digital signal is restored in the original time domain, and is transmitted to the audio signal D/A converter 15, whereas the discrimination signal is transmitted to the discrimination signal detector 16.

The audio digital signal is applied to an audio signal D/A converter 15 for converting the audio signal to an analog form and, in the meantime, the discrimination signal is applied to a discrimination signal detector 16 wherein the information contained in the discrimination signal is analyzed and detected for use in other control circuits (not shown) and display circuits (not shown).

Figure 5A:
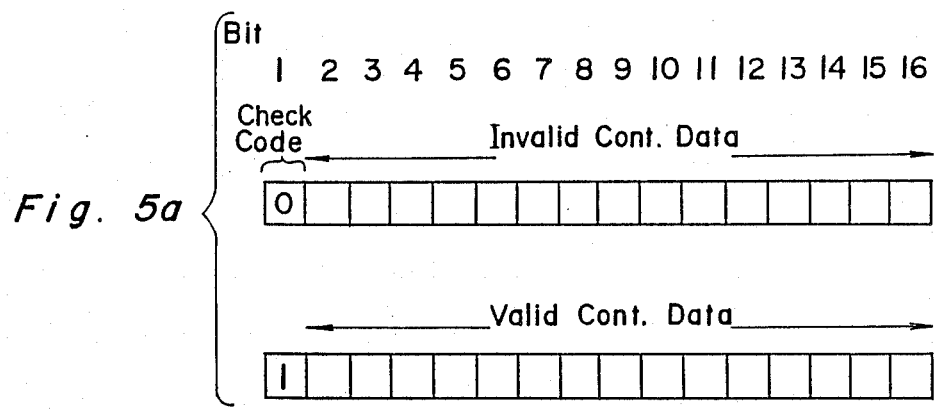
FIGS. 5a is a diagram for explaining a discrimination signal according to the present invention.

The discrimination signal is further described below with reference to FIGS. 5a and 5b.

The discrimination signal has a predetermined length and, according to one example, it is a 16-bit long signal. According to the example shown in FIG. 5a, the first bit is weighted as a check code for checking whether the remaining 15 bits contain valid or invalid information. For example, when the check code is "0", it indicates that the remaining 15 bits contain invalid information and, when the check code is "1", it indicates that the remaining 15 bits contain valid information. By the employment of the check code, all that is necessary during the recording mode is to set the check bit "0" to make the remaining 15 bits invalid. Therefore, it is not necessary to set the remaining 15 bits to a certain condition representing the invalid signal, thereby simplifying the circuit arrangement. During the reproducing mode, the check code is first detected. If it is a "1", the remaining 15 bits are taken in as containing a valid information for use in other circuits (not shown). If it is a "0", the remaining 15 bits are disregarded and are not used in the other circuits (not shown).

Figure 5B:
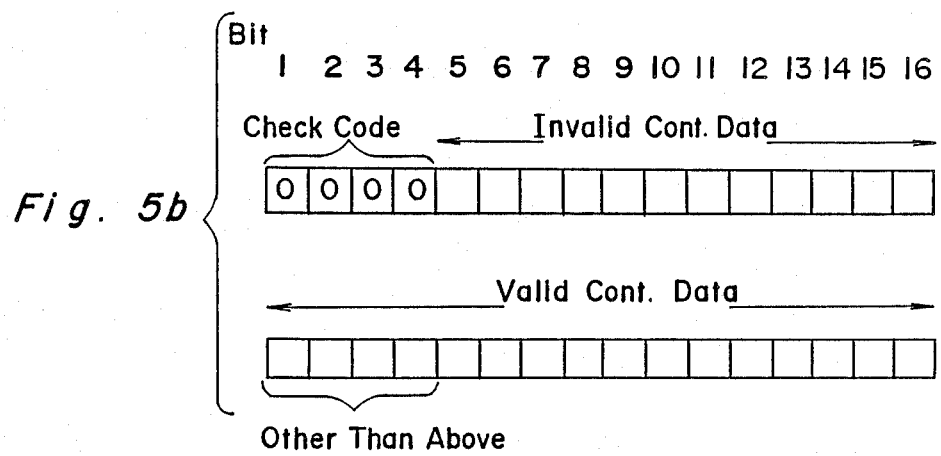
FIGS. 5b is a diagram for explaining a another discrimination signal according to the present invention.

Another example of a discrimination signal is shown in FIG. 5b. The discrimination signal shown has first to fourth bits occupied as a check code. Thus, the check code shown in FIG. 5a is 1-bit long, whereas the check code shown in FIG. 5b is 4-bits long. When the 4-bit long check code is "0000", it indicates that the discrimination signal is invalid. On the contrary, when the 4-bit long check code is other than "0000", it indicates that the discrimination signal is valid and, therefore, it should be used in other circuits. Since the check code is 4-bits long, there are 15 different combinations of check codes indicating that the discrimination signal is valid. Therefore, the 4-bit long check code can be used as a part of the valid information.

The detection of the check code is carried out by an OR gate (not shown) such that the 4 inputs of the OR gate receive the 4-bit long check code. When the OR gate OR1 produces a "0" output, it is understood that the applied check code is "0000", indicating that the discrimination signal is invalid. On the contrary, when the OR gate OR1 produces "1", it is understood that the applied check code is other than "0000", indicating that the discrimination signal is valid. Therefore, the detection as to whether the check code is a "0000" or a value other than "0000" can be carried out with a simple circuit.

When a magnetic tape which has been recorded by a device having no system for providing and utilizing the discrimination signal (hereinafter referred to as a non-discriminative type device) is reproduced by a device having a system for providing and utilizing the discrimination signal (hereinafter referred to as a discriminative type device), it is not only impossible for the discriminative type device to detect and read the discrimination signal, but also, there arises a problem that the detector erroneously reads a signal, which is not a check code, as a check code, resulting in erroneous operation and/or an error display. A similar error may occur when a tape recorded by the discriminative type device is reproduced by the non-discriminative type device. In other words, in either of the above cases, there is no compatibility of the magnetic tape. In order to satisfy the compatibility of the magnetic tape, it is necessary for both types of devices to employ a recording format having a space for the discrimination signal. However, according to the present invention, since the validity of the discrimination signal is judged by the detection whether or not the check code, which is being a part of the discrimination signal, has a predetermined pattern, it is necessary for the non-discriminative type device to employ an arrangement that sets up a dummy code representing, not the entire discrimination signal, but only the check code.

It is to be noted that the above described check code employed in the present invention is utterly different from the check code of prior art. The check code of prior art is used in combination with the data accompanying the check code such that the data accompanying the check code is processed through a certain calculation using the check code, and the data is judged as valid when the calculated result presents a predetermined signal pattern.

Therefore, such an arrangement in the nondiscriminative type can be simply accomplished. Furthermore, during the reproducing mode, the detection of the dummy code, if necessary, can be accomplished by a simple arrangement which detects several bits, such as 4 bits in the case of the example given in FIG. 5b.

According to the example shown in FIG. 5b, it is possible to indicate the type of valid information contained in the discrimination signal by utilizing the 4-bit long check code. For example, when the check code is "0001", it pattern of the remaining 12 bits is character or symbol information. In this case, the code pattern can be chosen from $2^{12} = 4096$ different patterns, each pattern carrying a particular character or symbol. When the check code is "0010", it may be so defined that the information contained in the code pattern is time. In this case, the 12-bit long code pattern is divided into three sections: the first section occupies the 5th to 9th bits for the indication of hours (0 to 24); the second section occupies the 10th 12th bits for the indication of the second place numeral minutes (0 to 5); and the third section occupies the 13th 16th bits for the indication of the first place numeral minutes (0 to 9). When the check code is "0100", it may be so defined that the information contained in the code pattern is frame number which can be any one of 0 to 4096.

In the reproducing mode, it is first detected whether the data in the check code section has a certain pattern indicating that the discrimination signal is invalid, or not. If the data in the check code section does not have a certain pattern, it is so judged that the discrimination signal is valid. In this case, the type of discrimination signal is further detected in accordance with the pattern of the check code. Then, the signal in the remaining 12 bits is demodulated for use in control or display.

According to the present invention, it is not necessary to provide in the discriminative type device a demodulating means that demodulates all the bit pattern of the discrimination signal. For example, when the discriminative type magnetic recording and reproducing device (first model device) has a means for demodulating only the codes representing the character or symbol information, such a demodulating means is operated only when a check code "0001" is detected. Another magnetic recording and reproducing device (second model device) may have a means for demodulating only the codes representing time information, and another device (third model device) may have a means for demodulating only the codes representing frame number information. Yet another magnetic recording and reproducing device (fourth model device) may have a means for demodulating codes representing character or symbol information, time information and frame number information.

According to the present invention, since the discrimination signal has a check code, a magnetic tape recorded by any one of the above described first to fourth model devices can be play-backed in every one of the above described first to fourth model devices without causing any erroneous operation. For example, a tape recorded by the first model device can be play-backed in the second model device without causing any error. In this case, the character or symbol recorded in the discrimination signal by the first model device will not be demodulated in the second model device. Therefore, the magnetic tape has a compatibility among all the models of the discriminative type magnetic recording and reproducing device.

Furthermore, so long as the non-discriminative type device is provided with a dummy code recording means and a check code detector, if necessary, the magnetic tape has a compatibility not only among the discriminative type devices by also among the non-discriminative type devices.

Figure 7:
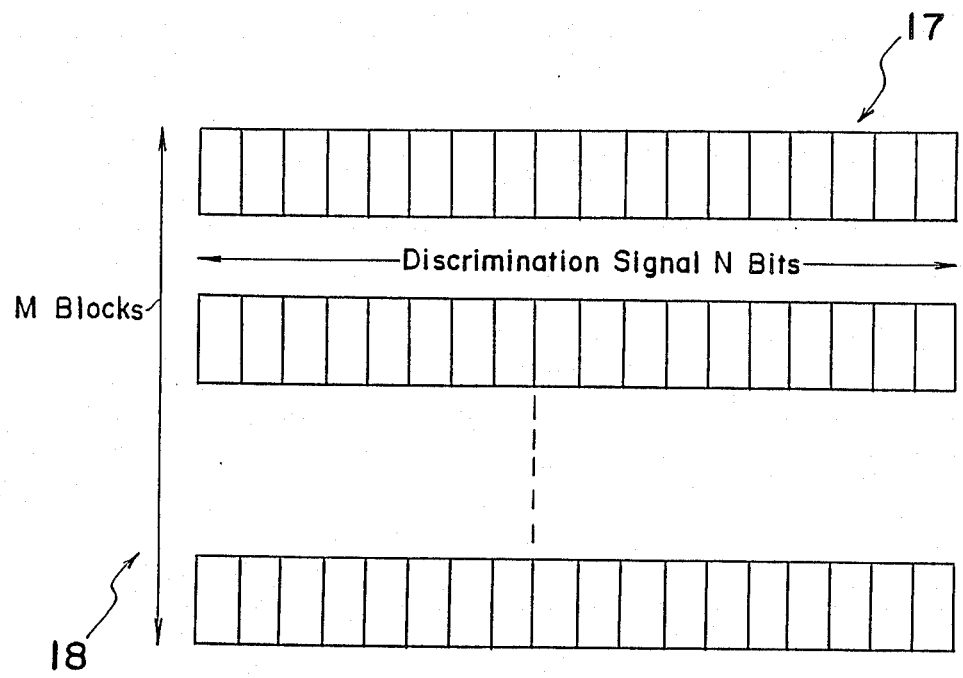
FIG. 7 is a diagram for explaining yet another discrimination signal according to the present invention.

Referring to FIG. 7, a diagram for explaining yet another discrimination signal according to the present invention is shown. A reference number 17 designates a block of discrimination signal provided in each field; each block is defined by N bits. A reference number 18 designates a group of discrimination signals containing M blocks. By this arrangement, it is possible to use the entire first block as a check code, and the remaining (M-1) blocks as codes carrying various information. For example, when the check code defined by the first block is (100 . . . 00), it may be so defined that the information contained in the code pattern of the remaining (M-1) blocks is time information; and when the check code defined by the first block is (110 . . . 00), it may be so defined that the information contained in the code pattern of the remaining (M-1) block is character or symbol information. In this manner, it is possible to provide any one of $2^N$ different types of information in each group. In this case, the setting of the discrimination signal can be carried out by the discrimination signal setting circuit shown in FIG. 6 and the detection of the discrimination signal can be carried out by the discrimination signal detector 16 also shown in FIG. 6.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of appended claims.

What is claimed is:

1. An apparatus for recording a discriminative signal in a magnetic recording and reproducing device having at least one rotating magnetic head for recording and reproducing a video signal and a digital signal in a contiguous manner along each track which is inclined at an angle relative to the direction of travel of a magnetic tape, said apparatus comprising:

a means for generating, during a recording mode, a discrimination signal having a first section carrying a check code and a second section carrying information, said check code being provided to indicate whether or not to use said information in said second section irrespective of the type of information carried in said second section;

a means for combining, during a recording mode, said discrimination signal in said digital signal; and a means for controlling, during a reproducing mode, the reproduction operation such that said controlling means determines whether or not the reproduced signal of the signal in said first section indicates that the information carried in said second section should be used, and such that the information carried in said second section is reproduced when the signal in said first section indicates that the information carried in said second section should be used, and such that the information carried in said second section is not reproduced when the signal in said first section indicates that the information carried in said second section should not be used;

whereby said magnetic tape, recorded either by a type of device which utilizes the information in the second section or a type of device which does not utilize the information in the second section, has a compatibility between said two types of devices.

2. A magnetic recording and reproducing device as claimed in claim 1, wherein said check code is defined by at least one binary signal, and wherein a predetermined code pattern is identical to "0".

* * * * *